United States Patent
Miyamoto (10) Patent No.: US 7,345,789 B2
(45) Date of Patent: Mar. 18, 2008

(54) IMAGE PROCESSING APPARATUS FOR PREPRESS PRINTING AND PREPRESS PRINTING SYSTEM

(75) Inventor: Katsumichi Miyamoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 721 days.

(21) Appl. No.: 10/867,839

(22) Filed: Jun. 16, 2004

(65) Prior Publication Data

US 2004/0257624 A1 Dec. 23, 2004

(30) Foreign Application Priority Data

Jun. 17, 2003 (JP) ............................ P2003-171846

(51) Int. Cl.
*H04N 1/405* (2006.01)
*G06F 3/12* (2006.01)

(52) U.S. Cl. ....................... 358/3.06; 358/3.2

(58) Field of Classification Search ................. 358/1.9, 358/3.01, 3.06, 3.07, 3.13, 3.2, 534, 535, 358/536
See application file for complete search history.

(56) References Cited

U.S. PATENT DOCUMENTS

| | | | |
|---|---|---|---|
| 4,984,097 A | * | 1/1991 | Shu ........................... 358/3.07 |
| 6,067,406 A | * | 5/2000 | Van Hoof et al. ............ 358/1.9 |
| 7,224,489 B2 | * | 5/2007 | Loce et al. .................. 358/3.2 |
| 2001/0017706 A1 | | 8/2001 | Shimazaki |

FOREIGN PATENT DOCUMENTS

| | | |
|---|---|---|
| EP | 1 026 577 A2 | 8/2000 |
| JP | 2000-242453 | 9/2000 |
| JP | 2000-322373 | 11/2000 |
| JP | 2001-245149 | 9/2001 |
| JP | 2002-142114 A | 5/2002 |
| JP | 2002-211097 A | 7/2002 |

* cited by examiner

*Primary Examiner*—Thomas D. Lee
(74) *Attorney, Agent, or Firm*—McDermott Will & Emery LLP (57) ABSTRACT

A RIP system (100) includes a multi-screening information generator (102) for generating a multi-screening information file ($D_{ms}$) which is an XML-format file containing information such as screen ruling, dot shape and screen angle, necessary for assigning a multi-screening operation, and discloses the multi-screening information file ($D_{ms}$) to outside of the RIP system by storing in a shared disk or a flexible disk. On an input data creation process side, a client machine makes reference to the multi-screening information file ($D_{ms}$), and thereby assign the multi-screening operation.

17 Claims, 7 Drawing Sheets

```
<?xml version="1.0" encoding="Shift_Jis"?>
-<recorder_spm_Information>
    <host Ip_address="123.456.78.90">ABNET</host>
    -<halftone_angle>
        <angle key="45">Y</angle>
        <angle key="15">M</angle>
        <angle key="0">C</angle>
        <angle key="75">K</angle>
    <halftone_angle>
    -<halftone_shape>
        <shape key="0.111">TF-012SQ01L</shape>
        <shape key="0.101">TF-040SQ01M</shape>
        <shape key="0.1134">TF-012SQ01M</shape>
    <halftone_shape>
    -<halftone_lines>
        <line key="80">080.SGD</lines>
        <line key="70">070.SGD</lines>
        <line key="60">060.SGD</lines>
    <halftone_lines>
    -<recorder_information>
      -<recorder nickname="R4000">
        -<shape name="TF1-012SQ01L"key="0.111">
            <line key="60">060.SGD</lines>
            <line key="70">070.SGD</lines>
        </shape>
        <shape name="TF1-012SQ01M"key="0.1134"/>
      </recorder>
      -<recorder nickname="R8000">
        -<shape name="TF1-012SQ01L"key="0.111">
            <line key="60">060.SGD</lines>
            <line key="70">070.SGD</lines>
        </shape>
        <shape name="TF1-012SQ01M"key="0.1134"/>
        <shape name="TF1-040SQ01M"key="0.101"/>
      </recorder>
      -<recorder nickname="R8600">
        -<shape name="TF1-012SQ01L"key="0.111">
            <line key="60">060.SGD</lines>
            <line key="70">070.SGD</lines>
        </shape>
        <shape name="TF1-012SQ01M"key="0.1134"/>
        <shape name="TF1-040SQ01M"key="0.101"/>
      </recorder>
    </recorder_information>
</recorder_spm_information>
```

IMAGE PROCESSING APPARATUS FOR PREPRESS PRINTING AND PREPRESS PRINTING SYSTEM

BACKGROUND OF THE INVENTION

1. Field of the Invention

The present invention relates to image processing apparatuses for prepress printing, such as RIP systems which create dot data representing images to be printed. More specifically, the present invention relates to assigning a multi-screening operation when creating the dot data.

2. Description of Background Art

In prepress printing systems a computer called the front-end is used in prepress processes to produce, edit, and layout the text, logos, images, pictures, illustrations, and other data parts composing the printed product, and thus output the edited layout data which is a set of data described in a page description language (hereinafter called "page description data"). Next, the edited layout data or the page description data undergoes a RIP process provided by a RIP system which is an image processing apparatus for prepress printing. In the RIP process, the page description data undergoes a rasterizing process (a RIP process in a narrow sense), and is converted to multi-valued bitmap data. Then the multi-valued bitmap data undergoes a halftone (screening) process, to be converted to dot data. In other words, an image represented by continuous gradation data is now represented by dot data. The screening process is specified by screen ruling or the number of screen mesh, dot shape and screen angle. In other words, the screen ruling, the dot shape and the screen angle determines a dot pattern in the prepared dot data. The dot data is then sent to an output device such as a plate recorder or digital printer, where the image represented by the dot data is recorded on a printing plate, paper or the like.

In such a prepress printing system as described above, when creating dot data through a screening process, there is a case in which a selected image(s) or object area(s) of the printed matter represented by the page description data must be screened by using a special dot pattern (screen ruling, dot shape and screen angle) which is different from a normal dot pattern to be assigned through a normal setting operation of the RIP system. Such a screening operation is called "multi-screening."

When creating dot data in the RIP system through a multi-screening operation, settings for the multi-screening operation require special information that relates a usable dot pattern to an output device which can make output by using this specific dot pattern. Conventionally, this information essential to the multi-screening operation (hereinafter called "multi-screening information") is not viewable unless a set of operations specific to the RIP system is performed. Furthermore, the multi-screening information is described in an uncommon format, stored within the RIP system, and is lacking in portability. As a result, any addition or other forms of revision made to the multi-screening information in the RIP system creates difficulties in maintaining information link between the input data creation process side working on the creation of edited layout data and the output operation process side working on the creation of dot data.

For this limitation in the conventional systems, instructions for multi-screening operations cannot be given directly from the input data creation process side. Instead, in order to do so, it is necessary to make an operation request or create links of instructions from the input data creation process side to the output operation process side. Such a task of linking instructions and making requests increases not only the amount of work in the process but also chances of mistakes.

SUMMARY OF THE INVENTION

It is therefore an object of the present invention to provide a RIP system (an image processing apparatus for prepress printing) and a prepress printing system in which multi-screening operations can be assigned directly from the input data creation process side.

A first aspect of the present invention provides an image processing apparatus for prepress printing, for creating dot data representing an image by dots through a screening operation performed to data representing the image by continuous gradation. The apparatus comprises:

a storage of screening information indicating a dot pattern usable for a multi-screening operation and output device information indicating an output device capable of outputting the image represented by the dot data created through the multi-screening operation;

an information generator for generating multi-screening information necessary for assigning the multi-screening operation, based on the screening information and the output device information; and a discloser for disclosing the multi-screening information outside the apparatus.

According to such a configuration as the above, multi-screening information is disclosed to outside of the image processing apparatus working on the creation of dot data. Therefore, by making references to the multi-screening information, multi-screening operations can be assigned directly and accurately from the input data creation process side. This eliminates the need for tasks of linking instructions and making requests between the input data creation process side (front end) and the output operation process side (RIP system), improving efficiency in assigning multi-screening operations as well as reducing chances of mistakes.

In an image processing apparatus for prepress printing, such as the above, it is preferable that:

the information generator generates the multi-screening information as a portable file referable outside the apparatus.

According to such a configuration as the above, the multi-screening information now has portability and therefore can be referable on a variety of computers regardless of their OS (Operating Systems). This eliminates the need for special operating procedures specific to the RIP system working on the creation of dot data or unique to applications.

In an image processing apparatus for prepress printing, such as the above, it is preferable that:

the multi-screening information includes information indicating a screen ruling, a dot shape and a screen angle which specify a dot pattern usable in the multi-screening operation.

In an image processing apparatus for prepress printing, such as the above, it is preferable that:

the discloser includes a storage accessible from outside of the apparatus via a predetermined communications network, and the disclosure is made by storing the multi-screening information in the storage.

According to such a configuration as the above, by making references to the multi-screening information from a computer on the input data creation process side via the communications network, multi-screening operations can be assigned directly and accurately from the input data creation process side.

In an image processing apparatus for prepress printing, such as the above, the discloser may include a recording medium driving unit for writing information into a removable recording medium, and the disclosure may be made by writing the multi-screening information into the removable recording medium.

According to such a configuration as the above, the output operation process side such as the RIP system can write multi-screening information into a removable recording medium, whereas the multi-screening information can be read out for reference by a computer on the input data creation process side, whereby multi-screening operations can be assigned directly and accurately from the input data creation process side.

A second aspect of the present invention provides a program for disclosing information necessary for assigning a multi-screening operation, to outside of an image processing apparatus for prepress printing, the apparatus creating dot data representing an image by dots through a screening operation performed to data representing the image by continuous gradation. The program, when executed by a computer in the apparatus, causing the computer to perform:

an information generating step of generating multi-screening information necessary for assigning a multi-screening operation, based on screening information indicating a dot pattern usable in the multi-screening operation and output device information indicating an output device capable of outputting the image represented by the dot data created through the multi-screening operation which are stored in a predetermined storage; and a disclosing step of disclosing the multi-screening information to outside of the image processing apparatus.

A third aspect of the present invention provides a prepress printing system which creates input data as page description data expressing an object of printing in a page description language, converts the input data into dot data expressing a grayscale image by dots, and outputs the image expressed by the dot data. The system comprises:

a client machine provided by a computer for creating the input data; and an image processing apparatus for creating the dot data. The image processing apparatus comprises:

a storage of screening information indicating a dot pattern usable for a multi-screening operation and output device information indicating an output device capable of outputting the image represented by the dot data created through the multi-screening operation;

an information generator for generating multi-screening information necessary for assigning the multi-screening operation, based on the screening information and the output device information; and a discloser for disclosing the multi-screening information outside the apparatus.

The client machine displays the multi-screening information, accepts an operation by a user who makes reference to the displayed multi-screening information, and creates the page description data containing information assigning a multi-screening operation, as input data containing a multi-screening output instruction, and:

the image processing apparatus further includes an output operation processor for performing the multi-screening operation in accordance with the assigning information thereby converting the input data including the multi-screening output instruction into the dot data.

A fourth aspect of the present invention provides a prepress printing method which creates input data as page description data expressing an object of printing in a page description language, converts the input data into dot data expressing a grayscale image by dots via a predetermined image processing apparatus, and outputs the image expressed by the dot data. The method comprises:

an information generating step of generating multi-screening information necessary for assigning a multi-screening operation, based on screening information indicating a dot pattern usable in the multi-screening operation and output device information indicating an output device capable of outputting the image represented by the dot data created through the multi-screening operation which are stored in a predetermined storage;

a disclosing step of disclosing the multi-screening information to outside of the image processing apparatus;

an input data creating step of creating the page description data as input data containing a multi-screening output instruction, with reference to the multi-screening information outside the image processing apparatus; and an output operating process step of performing the multi-screening operation in accordance with the multi-screening output instruction thereby converting the input data into the dot data, in the image processing apparatus.

These and other objects, features, aspects and advantage of the present invention will become more apparent from the following detailed description of the present invention when taken in conjunction with the accompanying drawing.

BRIEF DESCRIPTION OF THE DRAWINGS

FIG. 6 shows an example of a multi-screening information file created in the RIP system according to the embodiment.

DESCRIPTION OF PREFERRED EMBODIMENT

Hereinafter, an embodiment of the present invention will be described with reference to the attached drawings.

1. Prepress Printing System Configuration

Figure 1:
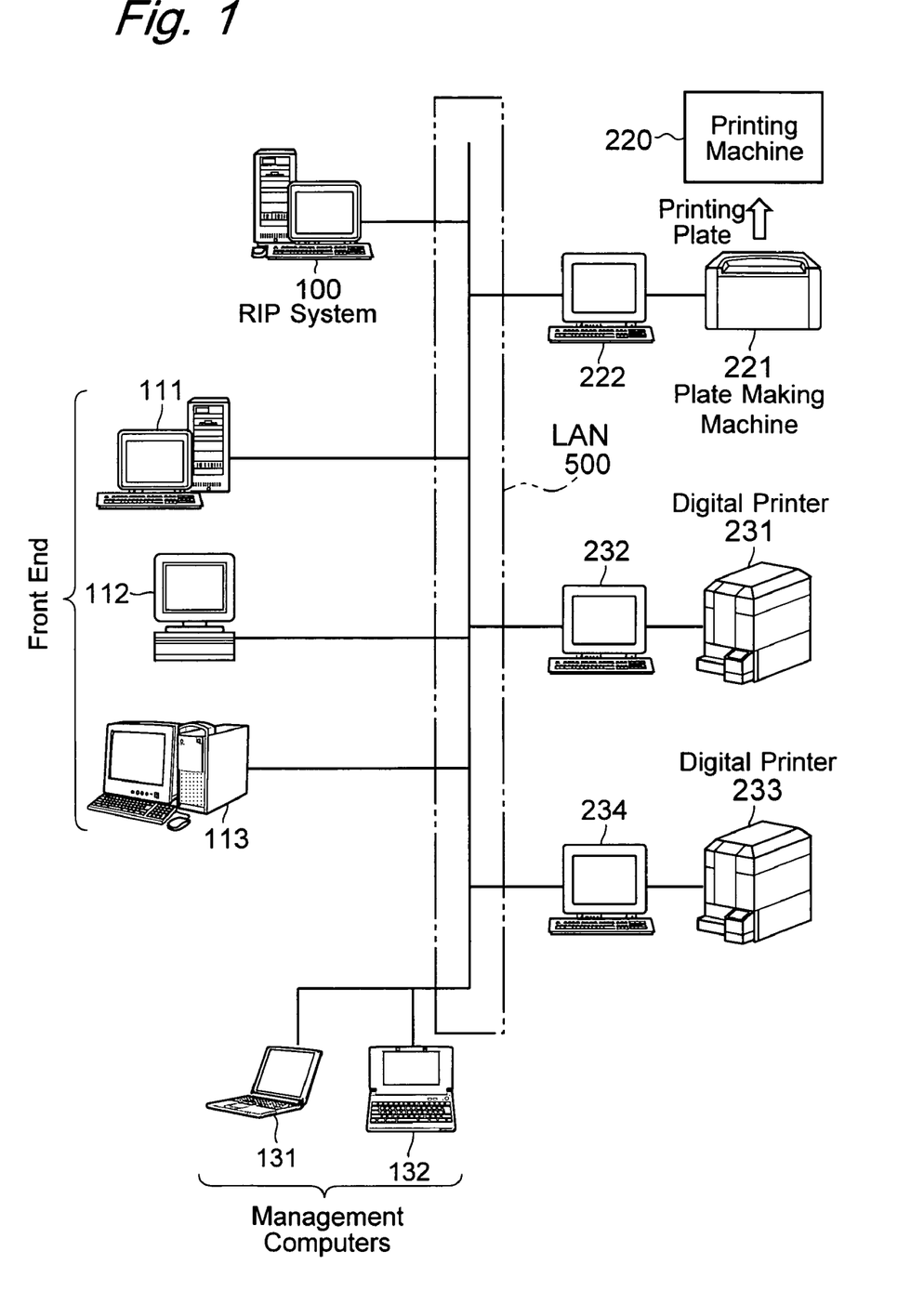
FIG. 1 is a configuration diagram of a prepress printing system including a RIP system according to an embodiment of the present invention.

FIG. 1 is a configuration diagram of a prepress printing system including a RIP system, which is an image processing apparatus for prepress printing, according to an embodiment of the present invention. The prepress printing system comprises front end computers 111-113 for edit and layout operations on different kinds of parts for a final printed matter, including characters, logos, patterns, illustrations and so on. The prepress printing system further comprises: a plate making machine 221 such as a plate recorder; a controlling computer 222 therefor; a printing machine 220 which uses a printing plate made by the plate making machine 221; a first digital printer 231; a controlling computer 232 therefor; a second digital printer 233; a controlling computer 234 therefor; a RIP system 100 which performs RIP process (a rasterizing process and a screening process) to create dot data to be used in the production of the printing plate; and managing computers 131, 132 for management of the entire flow of tasks from order reception through printing as well as delivery of the finished products. The front end computers 111-113 (hereinafter collectively called "frontend"), the computers 222, 232, 234 controlling the plate making machine 221 and the digital printers 231, 233, the RIP system 100 and managing computers 131, 132 can communicate with each other through mutual connection via a LAN (Local Area Network) 500.

It should be noted here however, that the number of front end computers, RIP system, plate making machine, digital printers and so on included in this prepress printing system are not limited to those illustrated in FIG. 1. Further, the RIP system 100, and the computers 222, 232, 234 controlling the plate making machine 221 and the digital printers 231, 233 may not be connected via a communication path such as a LAN.

In such a prepress printing system as described above, the front end performs editing and layout operations, to create page description data describing the object of printing in a page description language. The page description data is sent to the RIP system 100 or one of the controllers 222, 232, 234. The RIP system 100 or one of the controllers 222, 232, 234 which has received the page description data puts the page description data through a rasterizing process and a screening process, to create output data in the form of dot data. When the output data is made by the RIP system 100, the output data is forwarded to one of the controllers 222, 232, 234. The plate making machine 221 connected to the controller receiving the output data then makes a plate and the plate is used for printing by the printing machine 220, or one of the digital printers 231, 233 does printing using the output data. On the other hand, when the output data is generated by one of the controllers 222, 232, 234, a plate is made by the plate making machine 221 connected to the controller that generated the output data and the plate is then used for printing by the printing machine 220, or one of the digital printer 231 or 233 does printing using the output data.

As described, in the prepress printing system illustrated in FIG. 1, the front end 111-113 serves as an input data creating process side whereas the RIP system 100 and the controllers 222, 232, 234 serve as an output operation process side which receives the page description data created by the input data creating process side, performs the rasterizing process and the screening process, and thereby creates dot data. Each of the RIP system and the controllers 222, 232, 234 represents the image processing apparatus for prepress printing according to the present embodiment, and has characteristics provided by the present invention. For the sake of description, however, only the RIP system 100 will be taken as the image processing apparatus for prepress printing according to the present embodiment, in the description hereinafter.

2. RIP System Configuration and Operation

The RIP system 100, which is an image processing apparatus for prepress printing according to the present embodiment, performs a rasterizing process to page description data which is edited layout data created by the front end, thereby creates multi-valued bitmap data, i.e. bitmap data which represents a continuous tone image. The RIP system 100 further performs a screening process to the multi-valued bitmap data, to create dot data, i.e. bitmap data which represents the image by halftone dots.

Figure 2:
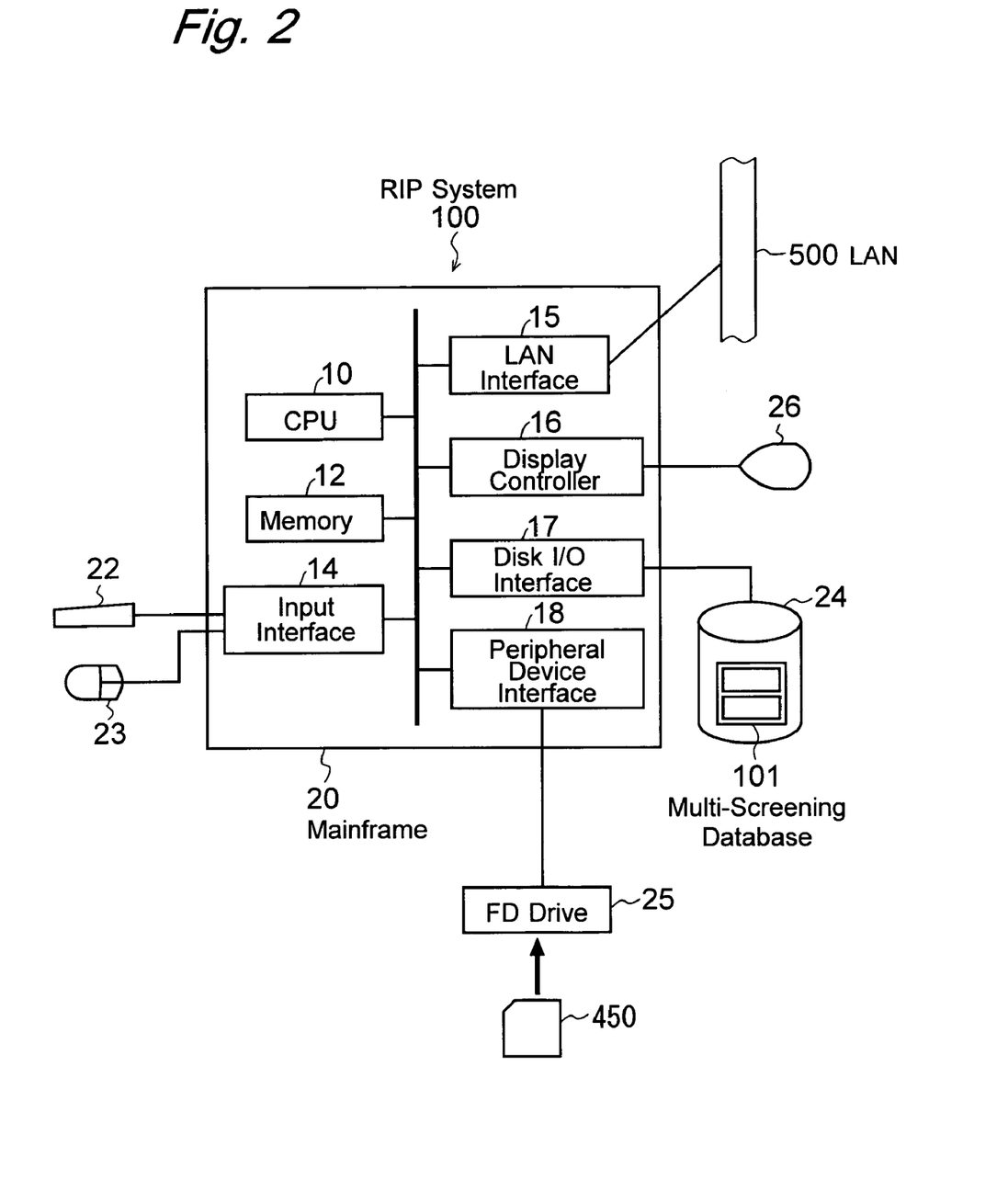
FIG. 2 is a block diagram showing a hardware configuration of the RIP system according to the embodiment.

FIG. 2 is a block diagram showing a hardware configuration of the RIP system 100. The RIP system 100 is realized by a general purpose computer such as a personal computer. In terms of hardware, the system 100 includes a computer mainframe 20, a keyboard 22, a mouse 23 and other input devices, a hard disk drive 24 serving as an auxiliary storage unit, and a display unit 26 provided by a liquid crystal display, a CRT or the like. The computer main frame 20 includes a central processing unit or a CPU 10, memories 12 provided by RAMs (Random Access Memory) and ROMs (Read Only Memory) for program storage and operations, an input interface 14 for connection with the keyboard 22, the mouse 23 and other input devices, LAN/IF 15 for connection of the RIP system 100 to the LAN 500, a display controller 16 for connection with the display unit 26, a disk I/O interface 17 for connection with the hard disk drive 24, and a peripheral device interface 18 for connection with a drive unit 25 of a portable recording medium or a flexible disk 450 (hereinafter called "FD drive").

In the RIP system 100, a predetermined program installed in the hard disk drive 24 is loaded onto the memory 12 and executed by the CPU 10, to realize an output operation processor which performs the above-described rasterizing process and screening process (hereinafter collectively called "output operating process" or "RIP process"), and a multi-screening information generator to be described later.

In the present embodiment, the above-described program for realizing the output operation processor and the multi-screening information generator in the RIP system 100 is provided by e.g. a computer readable recording medium such as a CD-ROM on which the program is recorded. Specifically, the user purchases a CD-ROM serving as the recording medium of these programs, and loads the CD-ROM on a CD-ROM drive unit (not shown) to read and install these programs from the CD-ROM to the hard disk drive 24. Alternatively, the program may be sent via the LAN 500 for installation into the hard disk drive 24. Still alternatively, the manufacturer of the RIP system 100 may install the program into the hard disk drive 24 before shipment.

Figure 3:
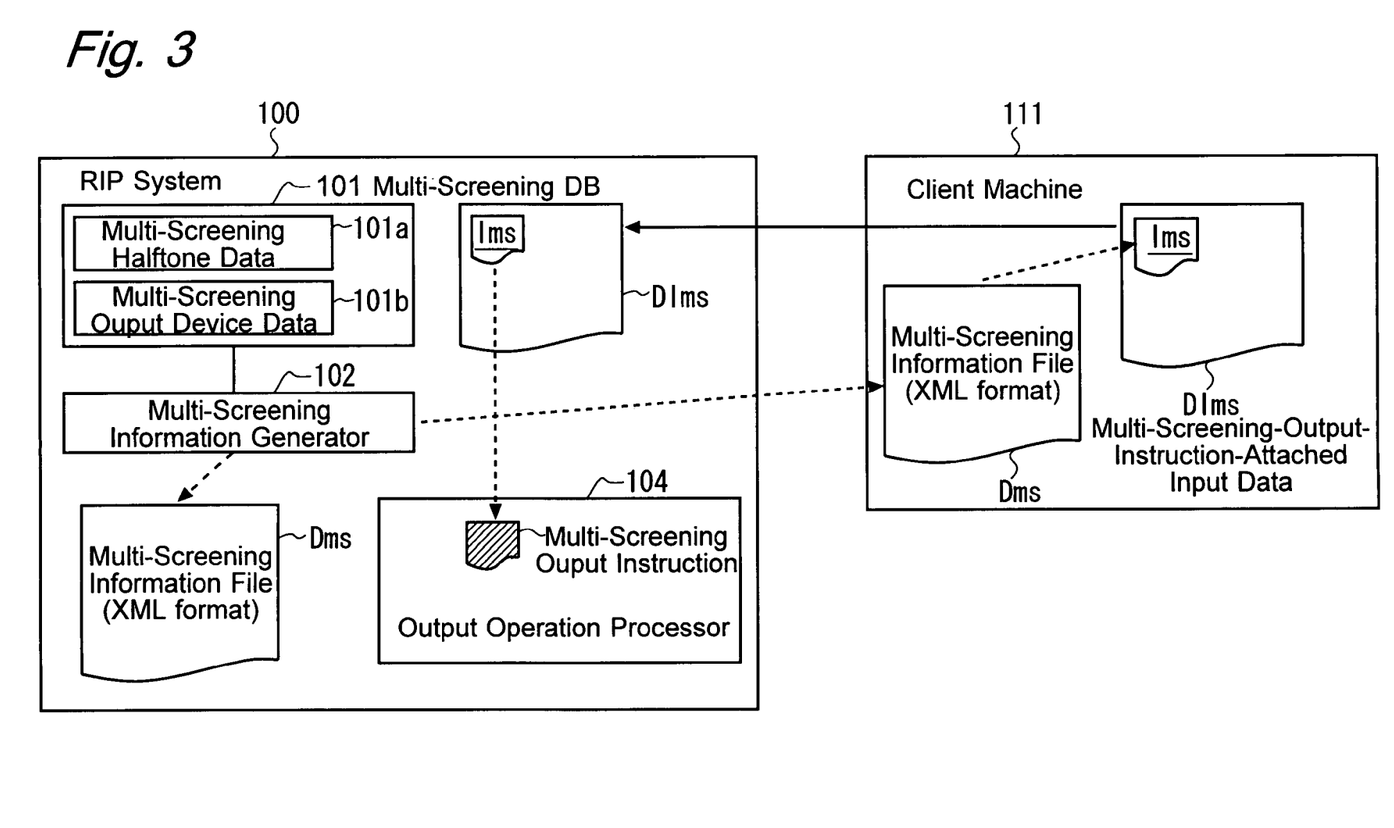
FIG. 3 is a block diagram showing a set of functions provided by the RIP system according to the embodiment.

FIG. 3 is a block diagram showing different functions of the RIP system 100 according to the present embodiment, together with a client machine which serves as the front end computer on the input data creation process side. In terms of function, the RIP system 100 includes a multi-screening database (hereinafter abbreviated as "multi-screening DB") 101, a multi-screening information generator 102 and an output operation processor 104.

The multi-screening DB 101 includes multi-screening halftone data 101a and multi-screening output device data 101b stored in the hard disk drive 24. The multi-screening output device data 101b is to identify output devices such as a plate recorder and a digital printer capable of outputting images provided by dot data created through multi-screening operations by the RIP system 100, onto an image recording medium such as a printing plate and paper. (Hereinafter, output devices identified with the multi-screening output device data 101b will be called "registered output devices".) The multi-screening halftone data 101a indicates dot patterns usable by the registered output devices. The dot patterns are defined by screen ruling, dot shape and screen angle. In the multi-screening DB 101, information indicating dot patterns usable in each of the registered output devices is related to the information that identifies a corresponding one of the output devices. Specifically, values representing the screen ruling, the dot shape and the screen angle that define dot patterns usable in each of the output devices are assigned to respective keys. For example, if one of the registered output devices can use screen ruling values of 1% and 10%, then, a key called "0.01" is assigned to the value "1%", and a key called "0.10" is assigned to the value "10%" in the form of an assignment table which is related to the identification information of this particular output device.

Figure 4:
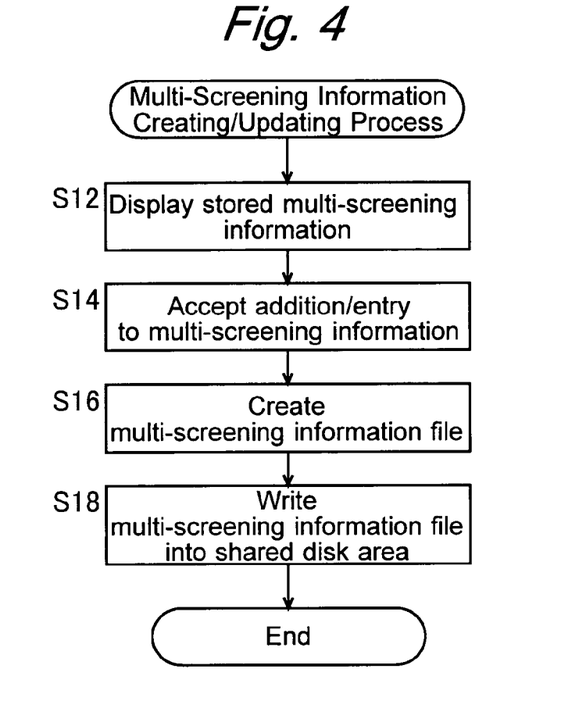
FIG. 4 is a flowchart showing a multi-screening information creating/updating process to realize a multi-screening information generator in the RIP system according to the embodiment.

The multi-screening information generator 102 is realized by software, through execution by the CPU 10 of a multi-screening information creating/updating process illustrated in a flowchart in FIG. 4. The multi-screening information generator 102 creates a file $D_{ms}$, which is a file that discloses multi-screening information, i.e. information necessary for assigning a multi-screening operation, to the outside of the RIP system 100. (Hereinafter, this file will be called "multi-screening information file".) The multi-screening information creating/updating process is started when addition or change has been made to the registration of output devices, upon a predetermined operation by the user to the RIP system 100. When this process is started, the CPU 10 performs an operation to be described below. It should be noted here that when this process is started, the above-described addition or change to the registration of output devices has been reflected to the multi-screening DB 101.

First, the stored multi-screening information, i.e. contents of the multi-screening information file $D_{ms}$ is displayed in the display unit 26 for the user to view multi-screening information stored currently (Step S12). However, when the multi-screening information file $D_{ms}$ is created for the first time, since there is no multi-screening information stored, a relevant message is displayed to inform the user. Next, the process accepts operations by the user for making an addition/entry to the multi-screening information (Step S14). Depending on the user's operation, the process makes references to the multi-screening DB 101, and creates a new multi-screening information file $D_{ms}$ (Step S16), and stores this new multi-screening information file $D_{ms}$ in a shared disk area of the hard disk drive 24, i.e. an area of a storage accessible by other computers 111-113 and apparatuses connected via the LAN 500 (Step S18). Alternatively or in addition to this, the new multi-screening information file $D_{ms}$ may be stored in the flexible disk 450 which is a removable recording medium driven by the FD drive 25, after storing or without storing the same information in a predetermined area of the hard disk drive 24.

In the present embodiment, the multi-screening information file $D_{ms}$ created in the Step S16 is a file in which the multi-screening information is described in a document format based on XML (extensible Markup Language). FIG. 6 shows an example of the multi-screening information file $D_{ms}$. In this diagram, statements ST1-ST3 represent a screen angle, a dot shape and a screen ruling respectively which specify a dot pattern usable in the RIP system 100. Statements ST4-ST6 represent information (screen information) indicating dot patterns usable in each of the registered output devices. The statement ST4 specifies a dot pattern usable in a recorder (output device) named "R4000", whereas the statement ST5 specifies a dot pattern usable in a recorder (output device) named "R8000". The statement ST6 specifies a dot pattern usable in a recorder (output device) named "R8600".

With this arrangement, at the front end (on the input data creation process side), a designer who is creating page description data as input data can make reference to the multi-screening information file $D_{ms}$, assign keys which represent a screen ruling, a screen angle and a dot shape usable in a registered output device, and thereby can assign a multi screening operation directly from the input data creation process side. In other words, one of the front end computers (hereinafter called "client machine" and will be represented by the computer 111) makes reference to the multi-screening information file $D_{ms}$ which is of an XML format and therefore portable. Based on this, the client machine creates input data $DI_{ms}$ containing multi-screening instructions $I_{ms}$ (hereinafter called "multi-screening-output-instruction-attached input data" or "IMS-attached input data"), which is then sent to the RIP system 100. Upon reception of the IMS-attached input data $DI_{ms}$, the RIP system 100 has the output operation processor 104 create dot data from the input data $DI_{ms}$.

Figure 5:
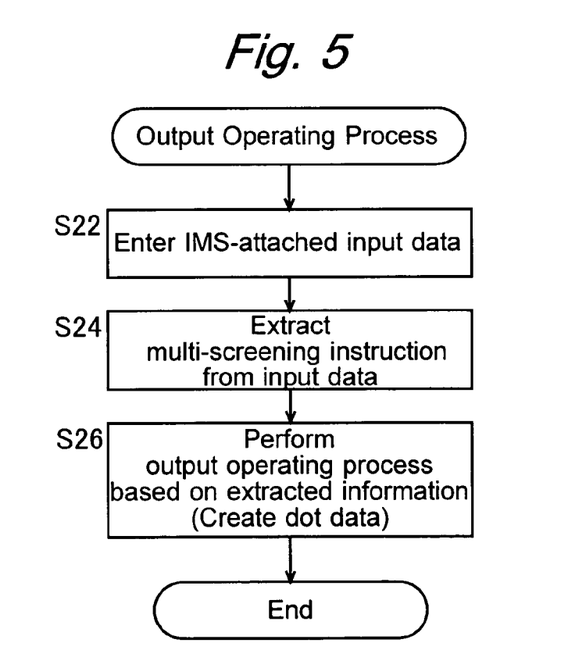
FIG. 5 is a flowchart showing an output operating process to realize an output operation processor in the RIP system according to the embodiment.

The output operation processor 104 is realized by software through execution by the CPU 10 of an output operating process illustrated in the flowchart of FIG. 5. This output operating process is started, based on user operation, when input data is to be received from the front end. Upon reception of the IMS-attached input data $DI_{ms}$ and starting of the process, the CPU 10 operates as below.

First, the IMS-attached input data $DI_{ms}$ from the front end (the client machine) is inputted into the RIP system 100 (more specifically, the data is stored in the memory 12 or the hard disk drive 24) (Step S22). Next, from the input data $DI_{ms}$, the multi-screening instruction $I_{ms}$ is extracted (Step S24). Then, based on the extracted information or the multi-screening instruction $I_{ms}$, an output operating process (a rasterizing process and a screening process) is performed to the input data $DI_{ms}$, to create dot data (Step S26). The multi-screening instruction $I_{ms}$ extracted from the input data $DI_{ms}$ is an expression in the above-described keys and the output device identification information. The multi-screening DB 101 describes corresponding relationship between the keys and respective specific values of the screen ruling dot shape, and screen angle which indicate a dot pattern usable in the multi-screening operation. Therefore, by making reference to the multi-screening DB 101, the CPU 10 can perform the output operating process which includes the multi-screening operation based on the multi-screening instruction $I_{ms}$, to the input data $DI_{ms}$.

Figure 7:
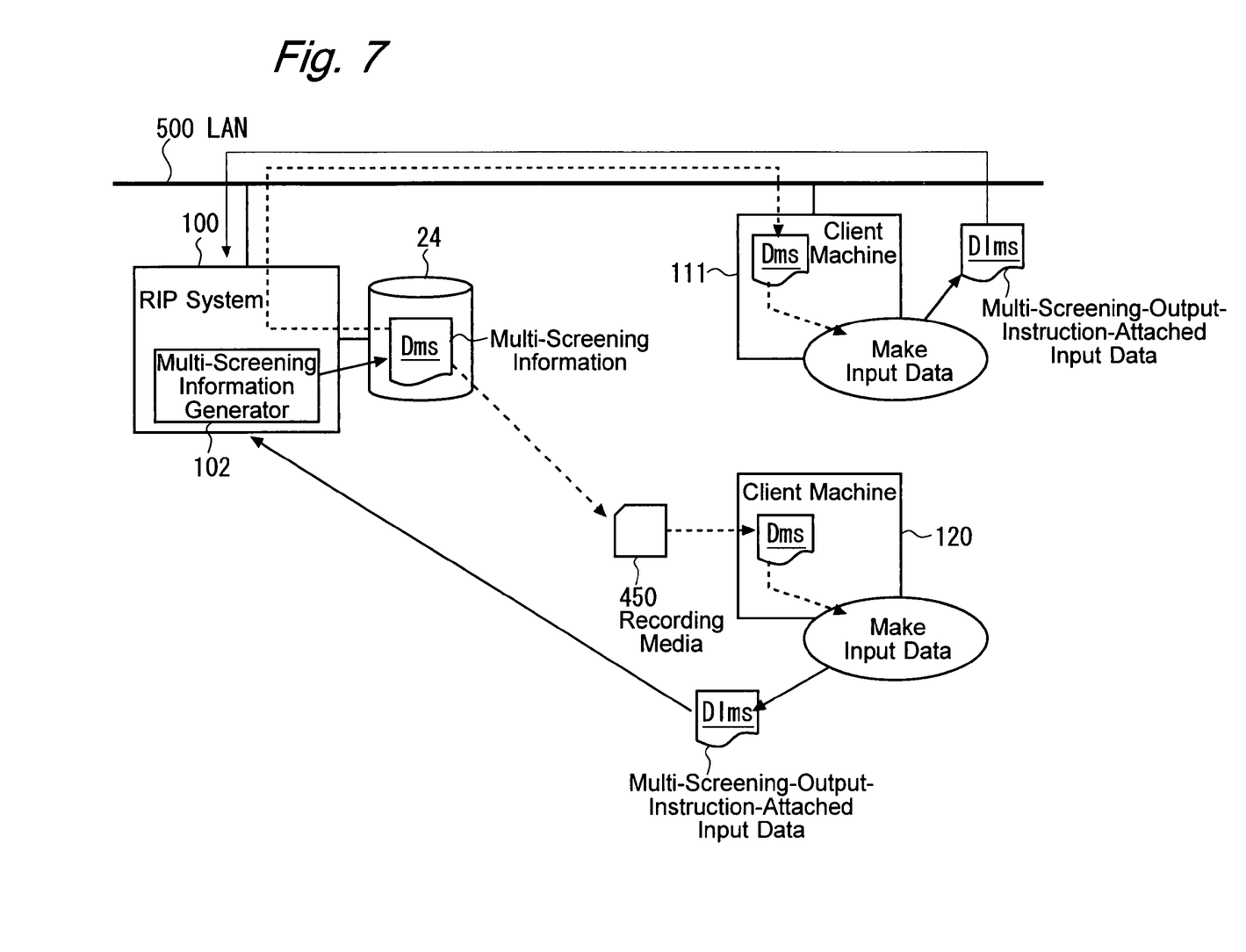
FIG. 7 is a block diagram showing a part relevant to multi-screening information in the prepress printing system including the RIP system according to the embodiment.
Figure 8:
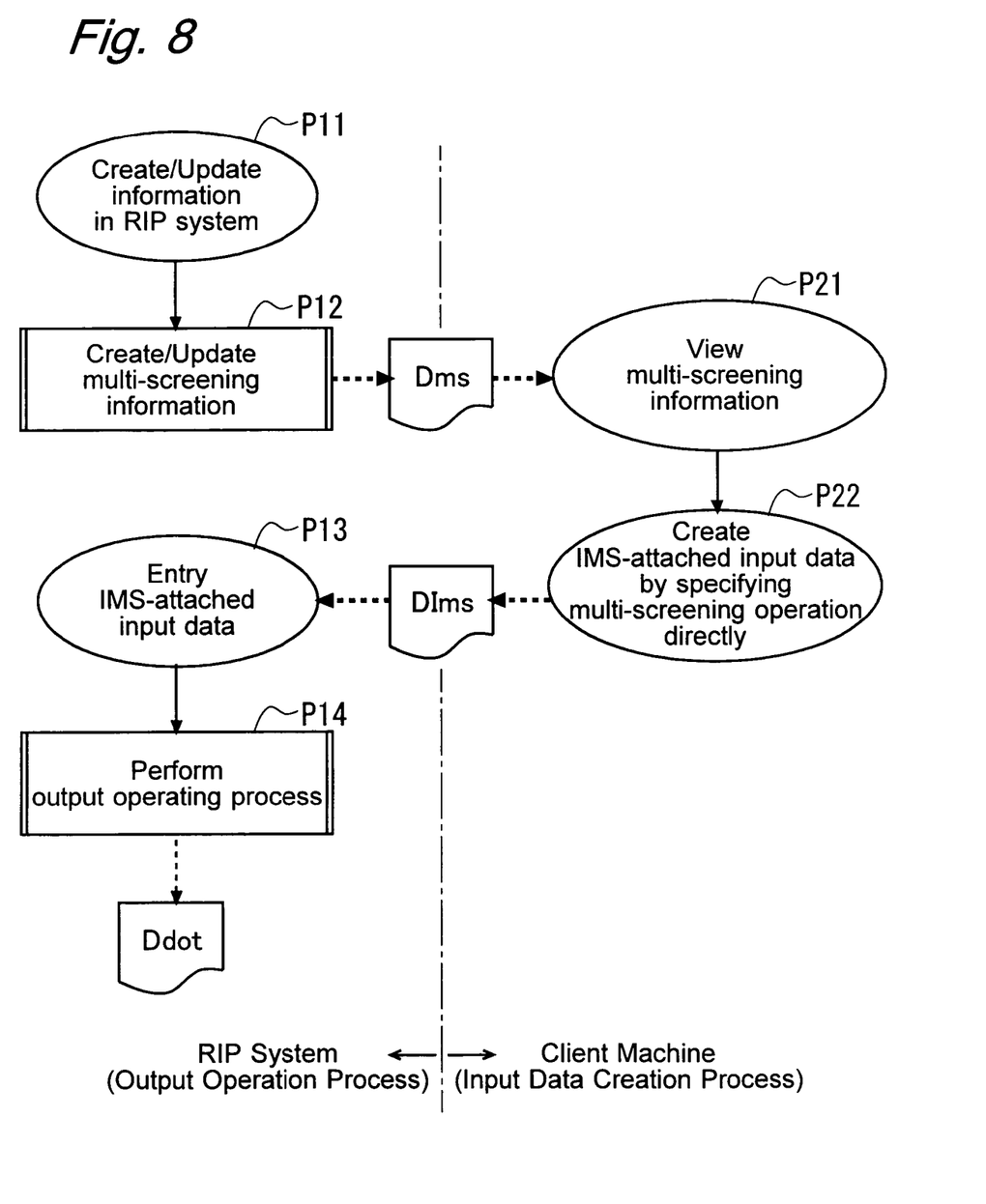
FIG. 8 is a flowchart showing a flow of process relevant to multi-screening information in the prepress printing system including the RIP system according to the embodiment.

3. Creation and Use of Multi-Screening Information in the Prepress Printing System FIG. 7 is a block diagram showing a part relevant to multi-screening information in the prepress printing system including a RIP system according to the present embodiment. FIG. 8 is a flowchart showing a flow of process relevant to the multi-screening information in this prepress printing system. Hereinafter, reference will be made to FIG. 7 and FIG. 8, and description will be given for creation and use of the multi-screening information in this prepress printing system.

The user makes settings or updates information in the RIP system 100 (P11). Thereafter, user's operation launches the multi-screening information creating/updating process P12 (See FIG. 4), which, as described earlier, invokes the multi-screening information generator 102 in the RIP system 100 to create the multi-screening information file $D_{ms}$ in an XML format. This multi-screening information file $D_{ms}$ is stored in a shared disk area of the hard disk drive 24, and thereby disclosed, so that the information can be referenced (viewed)

from outside of the RIP system 100. Alternatively or in addition to this, the multi-screening information file $D_{ms}$ may be stored in a flexible disk 450, and thereby disclosed, so that the information can be referenced (viewed) from outside of the RIP system 100.

When the disclosure of the multi-screening information file $D_{ms}$ is made by the storage in the shared disk area, the designer, i.e. the user of the front end client machine 111 connected to the LAN 500 can make reference to the multi-screening information file $D_{ms}$ through the LAN 500. Specifically, as shown in FIG. 1, the client machine 111 (the front end computer) is provided by a general purpose computer such as a personal computer including a display, disk drives, and an FD drive. (The hardware configuration is essentially the same as of the RIP system shown in FIG. 2.) Thus, by having the computer access the shared disk area to read the multi-screening information file $D_{ms}$ through the LAN 500, and display the information in the display device, the designer can view the multi-screening information file $D_{ms}$.

The multi-screening information file $D_{ms}$ is a file of an XML format. Therefore, if the computer serving as the RIP system 100 and the computer serving as the client machine 111 are different in terms of the machine type or the OS (Operating System) they use, such differences pose no problem for the client machine 111 in viewing the multi-screening information file $D_{ms}$. Further, if the front end includes a client machine 120 which is not connected with the LAN 500, the RIP system 100 can write the multi-screening information file $D_{ms}$ into a flexible disk 450, so that the flexible disk 450 is sent to the client machine 120. Then, the client machine 120 can use its FD drive to read the multi-screening information file $D_{ms}$ from the flexible disk 450.

On the client machines 111, 120, the users or the designer views the multi-screening information file $D_{ms}$ (P21) through the above-described operation, and creates the IMS-attached input data $DI_{ms}$ (P22) by assigning a multi-screening operation, using the registered output device identification information and the keys representing the screen ruling, the dot shape and the screen angle which define a dot pattern. In other words, the designer on the front end side can make reference to the multi-screening information file $D_{ms}$ and therefore can know easily what dot patterns are usable for any of the registered output devices. Thus, by embedding information such as predetermined keys which specify a desired dot pattern as additional information to the input data prepared as the page description data, the designer can specify a multi-screening operation directly. Embedding a piece of information such as multi-screening specification into page description data is already publicly known, and therefore will not be described here.

IMS-attached input data $DI_{ms}$ created as above, on the front end side (by a client machine) is sent to the RIP system 100 via the LAN 500 or via a flexible disk 450. The user of the RIP system 100 performs a predetermined operation to enter the IMS-attached input data $DI_{ms}$ into the RIP system 100 (P13). Based on this operation, the output operation processor 104 described earlier performs the output operating process (FIG. 5) to the entered IMS-attached input data $DI_{ms}$ (P14), to create dot data $D_{dot}$ which reflects the multi-screening output instruction.

The dot data $D_{dot}$ thus created is sent to an output device specified in the multi-screening output instruction $I_{ms}$. For example, the data is sent to the plate making machine 221 via its controller 222. In this case, the plate making machine 221 produces a printing plate recording an image given by the dot data $D_{dot}$.

4. Advantages

According to the present embodiment, multi-screening information which is necessary for assigning a multi-screening operation, i.e. multi-screening information file $D_{ms}$ containing information which relates a usable dot pattern to an output device which can make an output by using this specific dot pattern, is disclosed via a LAN 500 or a flexible disk 450 to the outside of a RIP system 100 (typically for viewing through front-end client machines). Therefore, the user of the client machines or the designer can make reference to the multi-screening information file $D_{ms}$. Then, by embedding predetermined keys which specify a desired dot pattern usable in one of the registered output devices, to the input data prepared as the page description data, the designer can assign a multi-screening operation directly. In this way, the front end side (input data creation process side) can assign a multi-screening operation (by selecting a target image or object area, a set of screen ruling, dot shape and screen angle defining a dot pattern to be used, and an output device to be used) directly and accurately. This not only improves efficiency in making instructions for multi-screening operations, but also reduces chances for mistakes.

Further, according to the present embodiment, the multi-screening information file $D_{ms}$ is a file of an XML format, and therefore has a high portability. Thus, the file can be referred (viewed) on many kinds of client machine running on different operating systems. As a result, when viewing the multi-screening information file $D_{ms}$, there is no need to use the RIP system 100 or to use a specific set of operations which differ from one application from another.

5. Variations, etc.

According to the embodiment, the multi-screening information file $D_{ms}$ disclosed outside the RIP system is based on an XML. Alternatively, other languages and formats, such as CSV (Comma Separated Value format), which are independent from machine types and operating systems and thus have portability may be used to create the multi-screening information file, although XML bases are more advantageous over CSV bases or others in terms of readability and other usability criteria.

Further, according to the embodiment, the multi-screening information file $D_{ms}$ is disclosed to the outside of the RIP system 100 via a recording medium provided by a flexible disk 450. Alternatively or together with this, other portable recording media (such as CD-ROM and CD/R) may be used in the disclosure of the multi-screening information file $D_{ms}$.

Still further, according to the embodiment, when addition or change has been made to the registered output devices, the multi-screening information creating/updating process is started on the basis of user operation (user event). Alternatively, the multi-screening information creating/updating process may be started automatically when addition or change has been made to the registered output devices.

While the invention has been described in detail, the foregoing description is in all aspects illustrative and not restrictive. It is understood that numerous other modifications and variations can be devised without departing from the scope of the invention.

The present application is an application claiming priority based on the Japanese Patent Application No. 2003-171846 filed on Jun. 17, 2003, the contents of which are incorporated herein by reference.

What is claimed is:

1. An image processing apparatus for prepress printing, for creating dot data representing an image by dots through a screening operation performed to data representing the image by continuous gradation, the apparatus comprising:
 a storage of screening information indicating a dot pattern usable for a multi-screening operation and output device information indicating an output device capable of outputting the image represented by the dot data created through the multi-screening operation;
 an information generator for generating multi-screening information necessary for assigning the multi-screening operation, based on the screening information and the output device information; and
 a discloser for disclosing the multi-screening information outside the apparatus.

2. The apparatus according to claim 1, wherein the information generator generates the multi-screening information as a portable file referable outside the apparatus.

3. The apparatus according to claim 1, wherein the multi-screening information includes information indicating a screen ruling, a dot shape and a screen angle which specify a dot pattern usable in the multi-screening operation.

4. The apparatus according to claim 1, wherein the discloser includes a storage accessible from outside of the apparatus via a predetermined communications network, the disclosure being made by storing the multi-screening information in said storage.

5. The apparatus according to claim 1, wherein the discloser includes a recording medium driving unit for writing information into a removable recording medium, the disclosure being made by writing the multi-screening information into the removable recording medium.

6. A computer readable recording medium having a program for disclosing information necessary for assigning a multi-screening operation, to outside of an image processing apparatus for prepress printing, the apparatus creating dot data representing an image by dots through a screening operation performed to data representing the image by continuous gradation, the program, when executed by a computer in the apparatus, causing the computer to perform:
 an information generating step of generating multi-screening information necessary for assigning a multi-screening operation, based on screening information indicating a dot pattern usable in the multi-screening operation and output device information indicating an output device capable of outputting the image represented by the dot data created through the multi-screening operation which are stored in a predetermined storage; and
 a disclosing step of disclosing the multi-screening information to outside of the image processing apparatus.

7. The computer readable recording medium according to claim 6, wherein in the information generating step the multi-screening information is generated as a portable file referable outside the apparatus.

8. The computer readable recording medium according to claim 6, wherein the apparatus includes a storage accessible from outside of the apparatus via a predetermined network, and
 wherein in the disclosing step the multi-screening information is disclosed by storing the multi-screening information in said storage.

9. The computer readable recording medium according to claim 6, wherein the apparatus includes a recording medium driving unit for writing information into a removable recording medium, and wherein in the disclosing step the multi-screening information is disclosed by writing the multi-screening information into the removable recording medium.

10. A prepress printing system which creates input data as page description data expressing an object of printing in a page description language, converts the input data into dot data expressing a grayscale image by dots, and outputs the image expressed by the dot data, comprising:
 a client machine provided by a computer for creating the input data; and
 an image processing apparatus for creating the dot data, wherein the image processing apparatus comprises:
 a storage of screening information indicating a dot pattern usable for a multi-screening operation and output device information indicating an output device capable of outputting the image represented by the dot data created through the multi-screening operation;
 an information generator for generating multi-screening information necessary for assigning the multi-screening operation, based on the screening information and the output device information; and
 a discloser for disclosing the multi-screening information outside the apparatus,
 wherein the client machine displays the multi-screening information, accepts an operation by a user who makes reference to the displayed multi-screening information, and creates the page description data containing information assigning a multi-screening operation, as input data containing a multi-screening output instruction, and
 wherein the image processing apparatus further includes an output operation processor for performing the multi-screening operation in accordance with the assigning information thereby converting the input data including the multi-screening output instruction into the dot data.

11. The system according to claim 10, wherein the information generator generates the multi-screening information as a portable file referable outside the apparatus.

12. The system according to claim 10, wherein the discloser includes a storage accessible from outside of the apparatus via a predetermined communications network, the disclosure being made by storing the multi-screening information in said storage,
 the client machine reading out and displaying the multi-screening information via the communications network.

13. The system according to claim 10, wherein the discloser includes a recording medium driving unit for writing information into a removable recording medium, the disclosure being made by writing the multi-screening information into the removable recording medium,
 the client machine reading out and displaying the multi-screening information from the removable recording medium.

14. A prepress printing method which creates input data as page description data expressing an object of printing in a page description language, converts the input data into dot data expressing a grayscale image by dots via a predetermined image processing apparatus, and outputs the image expressed by the dot data, the method comprising:
 an information generating step of generating multi-screening information necessary for assigning a multi-screening operation, based on screening information indicating a dot pattern usable in the multi-screening operation and output device information indicating an output device capable of outputting the image represented by the dot data created through the multi-screening operation which are stored in a predetermined storage;

a disclosing step of disclosing the multi-screening information to outside of the image processing apparatus;

an input data creating step of creating the page description data as input data containing a multi-screening output instruction, with reference to the multi-screening information outside the image processing apparatus; and an output operating process step of performing the multi-screening operation in accordance with the multi-screening output instruction thereby converting the input data into the dot data, in the image processing apparatus.

15. The method according to claim 14, wherein in the information generating step the multi-screening information is generated as a portable file referable outside the apparatus.

16. The method according to claim 14, wherein the information processing apparatus includes a storage accessible from outside of the image processing apparatus via a predetermined network, and wherein in the disclosing step the multi-screening information is disclosed by storing the multi-screening information in said storage.

17. The method according to claim 14, wherein the apparatus includes a recording medium driving unit for writing information into a removable recording medium, and wherein in the disclosing step the multi-screening information is disclosed by writing the multi-screening information into the removable recording medium.

* * * * *